UNITED STATES PATENT OFFICE.

LOUIS L. JACKSON, OF NEW YORK, N. Y., ASSIGNOR OF ONE-HALF TO ODUS C. HORNEY, OF NEW YORK, N. Y.

PROCESS FOR PREPARING ALUMS FROM CLAY OR OTHER SIMILAR NATURAL COMPOUNDS OF ALUMINA.

1,254,229.  Specification of Letters Patent.  Patented Jan. 22, 1918.

No Drawing.  Application filed January 11, 1917.  Serial No. 141,802.

*To all whom it may concern:*

Be it known that I, LOUIS L. JACKSON, a citizen of the United States, residing at New York city, county of New York, and State of New York, have invented a new and useful Improvement in Processes for Preparing Alums from Clay or other Similar Natural Compounds of Alumina, of which the following is a full, clear, and exact description.

The object of my invention is to provide a more simple and economical method than has heretofore been known for the preparation of alums from clay.

It has been proposed heretofore to first calcine clay to free it from its water of hydration, a high temperature being required for that purpose, and to then digest the calcined clay with a strong solution of niter cake at a temperature a little over 100 degrees C. The contents of the vessel are let out and allowed to stand until the free acid of the niter cake has been entirely taken up by the alumina, which may require several days, and the solid cake formed is dissolved in hot water, using enough water to obtain a solution of about 40° Tw. The solution is then separated by filtration through a filter press. The clear liquor is then concentrated until a solution of 56° Tw. at 40 degrees C. is obtained. It is then run into crystallizers where a certain proportion of the sodium sulfate crystallizes out as Glauber salts. On further evaporation crystallized soda alum is formed.

The specific object of my invention is to substantially modify the foregoing process so that the process may be carried out with the economy required to make it commercially feasible.

An important feature of the process is that I treat the clay in an uncalcined condition and heat it with niter cake, at a temperature of at least 150 degrees C. but at a temperature below the temperature required to preliminarily calcine the clay and at a temperature below that required to decompose niter cake alone. As an example, I may use 100 parts by weight of the clay and 280 parts by weight of the niter cake and continue the heating for about one hour. An excess of niter cake is desirable, but only a small excess is required. Silica, soda alum and sodium sulfate are formed, the silica being in an insoluble condition, whereas in the known process above described a considerable quantity of the silica is soluble. The soda alum and sodium sulfate are dissolved out with water and separated by crystallization. Alternatively, ammonium sulfate or potassium sulfate may be added in the proportion of one molecule of the sulfate to each molecule of alum, and the more sparingly soluble ammonia alum or potash alum may be obtained.

While the temperature must exceed 150 degrees C., it is uneconomical to employ a temperature much above 400 degrees C., but it would be possible to get good decomposition at any temperature above 400° at which all the products used and made are stable if heated by themselves. On the whole, I prefer a temperature of about 350 degrees C.

The process differs from the known process described in the following important particulars. I accomplish the desired result by the two simple steps of heating and the dissolving out with water of the soda alum and the sodium sulfate, dispensing with the calcination of the clay, and also the separation of the solution by filtration, and the evaporation to dryness, before dissolving out the soda alum and sodium sulfate.

The silica is rendered almost entirely insoluble. The percentage of decomposition is high. Iron vessels are but slightly attacked. Thus the process is rendered commercially practicable and economical.

While I have referred only to the treatment of clay, other silicates of alumina must be regarded as the equivalent of clay, my invention, so far as I know, being equally applicable thereto. By the term "silicates of alumina" I mean to include only those minerals whose essential constituents are only silica and alumina or only silica, alumina and water. The great majority of silicates containing alumina contain also one or more of the other metallic oxids, and are properly designated as double silicates of alumina or complex silicates of alumina, as an example of which may be mentioned feldspar, with which my process is unworkable. In using in the claims the word "clay" I do not mean to include feldspar or other double or complex silicates of alumina with which my process is wholly or substantially inoperative.

While I have cautioned against the use of a temperature even high enough to decompose niter cake alone it will be understood that the maintenance of a substantially lower temperature, say 350° C., is only necessary for such length of time as is required to form silica in an almost insoluble condition, soda alum and sodium sulfate. Thereafter, while a gradual heating up even to a temperature that would suffice to decompose niter cake alone would not destroy the previously formed product, such operation would be entirely purposeless, useless and wasteful. On the other hand, subjecting the clay and niter cake initially to so high a temperature would result in a failure to attain the objects of my invention.

Having now fully described my invention, what I desire to claim and protect by Letters Patent is:

1. In the process of preparing alum from clay, forming silica in an almost entirely insoluble condition, soda alum and sodium sulfate, by heating the clay in an uncalcined condition with niter cake.

2. In the process of preparing alum from clay, forming silica in an almost entirely insoluble condition, soda alum and sodium sulfate, by subjecting the uncalcined clay and niter cake to a temperature not below 150 degrees C. and below the temperature required to decompose niter cake alone.

3. In the process of preparing alum from clay, forming silica in an almost entirely insoluble condition, soda alum and sodium sulfate, by heating the clay in an uncalcined condition with niter cake and subsequently separating the insoluble silica from the soluble ingredients.

4. In the process of preparing alum from clay, forming silica in an almost entirely insoluble condition, soda alum and sodium sulfate, by subjecting the uncalcined clay and niter cake to a temperature not below 150 degrees C. and below the temperature required to decompose niter cake alone and subsequently separating the insoluble silica from the soluble ingredients.

In testimony of which invention, I have hereunto set my hand, at New York city, on this 10th day of January, 1917.

LOUIS L. JACKSON.